Nov. 28, 1961  F. R. CONIBEAR  3,010,245
TRAPS
Filed March 17, 1958  2 Sheets-Sheet 1
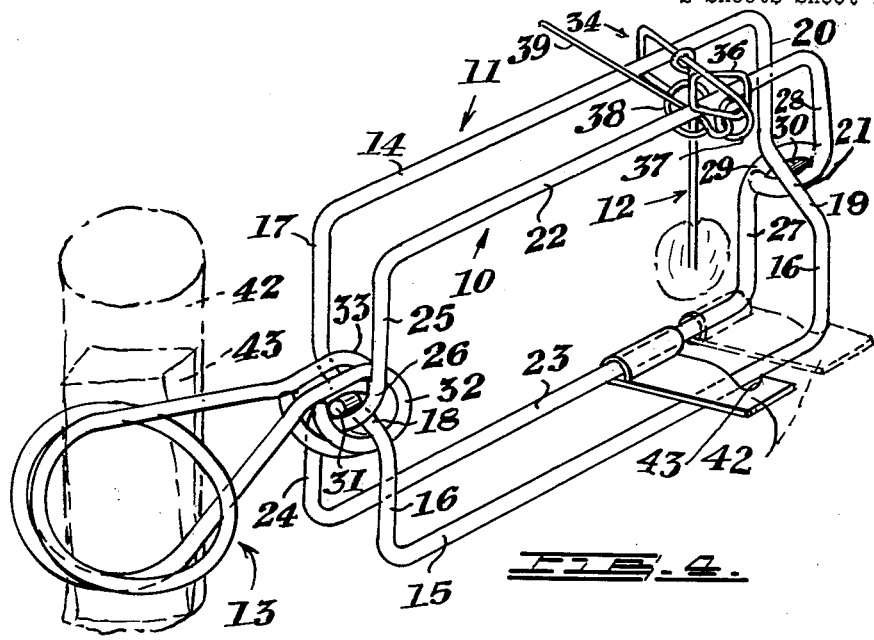
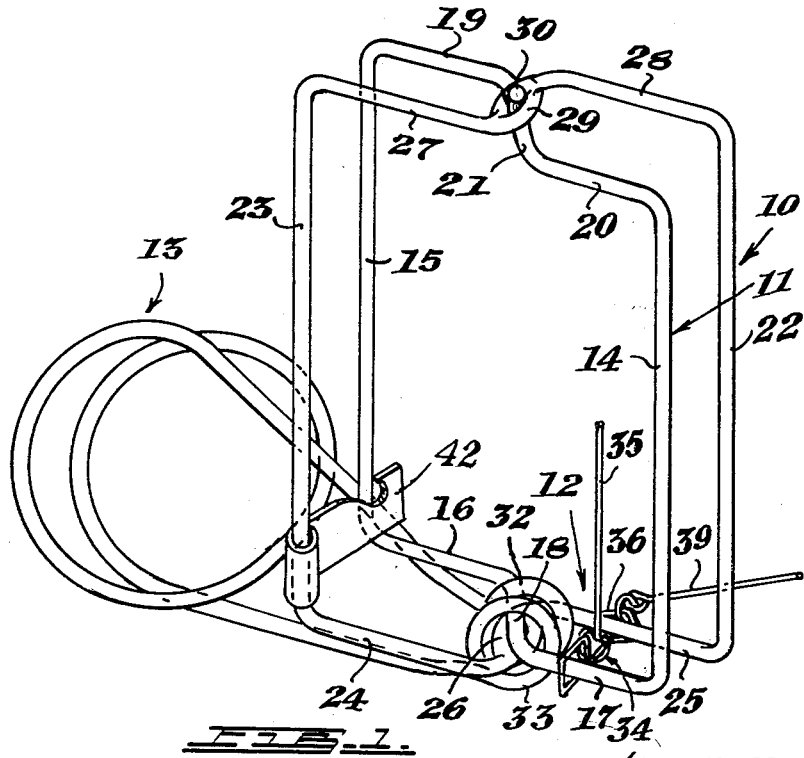
INVENTOR
FRANK R. CONIBEAR
By—Smart & Biggar
ATTORNEYS

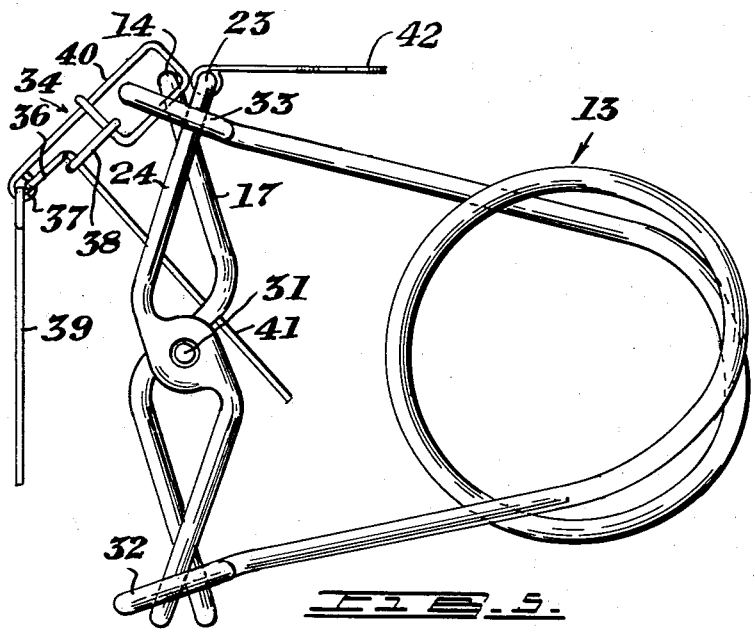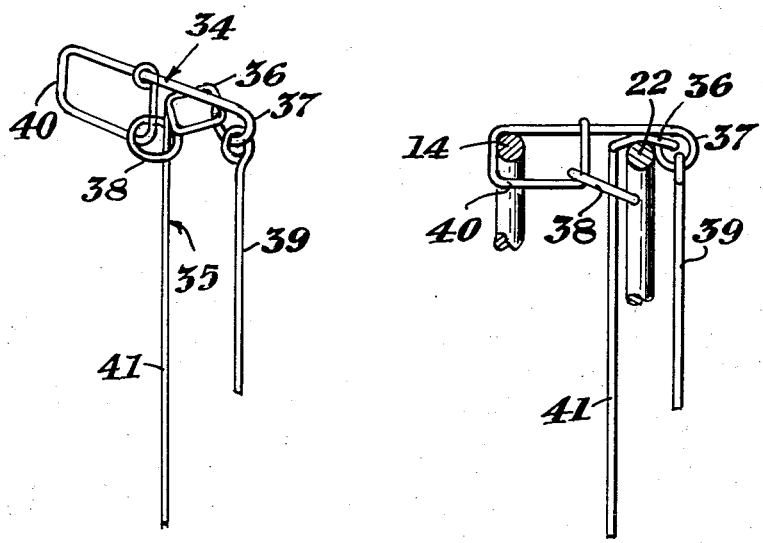

United States Patent Office 3,010,245
Patented Nov. 28, 1961

3,010,245
TRAPS
Frank R. Conibear, Victoria, British Columbia, Canada, assignor to Animal Trap Company of America, Lititz, Pa.
Filed May 17, 1958, Ser. No. 721,984
10 Claims. (Cl. 43—90)

The invention relates to traps for catching animals.

There is a need for traps for animals which not only meet the requirements of trappers but also take humane considerations into account. Trappers require portable traps which are light, compact and adaptable to being set in a variety of positions for catching different sizes and species of animals without damage to their pelts. Traps should not be made inoperative by snow or ice and should require little if any concealment. For humane considerations a trap should kill quickly without possibility of the injured animal freeing itself by, for example, gnawing or twisting off a leg as is often the case with conventional leghold types of traps.

The invention meets trappers requirements as well as taking into account humane considerations. A trap according to the invention is effective only against animals of a size for which the trap is designed, or for which the trap can be adjusted, and it kills quickly by choking, or by suffocation caused by pressure on the lungs.

A trap according to the invention comprises a pair of frames pivoted on a common axis to form by their side members two pairs of coacting jaws. A spring means connected to ring members slidable along at least one set of end members of the frames is used to urge the jaws to closed positions. The end members cooperating with the ring members are shaped so that in the open position of the trap these end members lie substantially parallel to each other while the portions of these end members near the common axis of the frames form a cross with each other within the ring members of the spring means. When the jaws are in open position and for the initial period of their travel, a relatively small pressure can be exerted by the spring means so that an animal which is too large for the trap is permitted to escape substantially unharmed. As the jaws close the pressure increases rapidly so that an animal for which the trap is designed is securely held and quickly choked.

Some preferred embodiments of the invention will now be described with reference to the accompanying drawings in which, FIGURE 1 is perspective view illustrating the trap of the present invention in the open or set position, FIGURE 2 is a pictorial drawing illustrating the trigger means of the invention, FIGURE 3 is a pictorial drawing illustrating the trigger means in the set position, FIGURE 4 is a perspective view illustrating an alternative way of setting the trap of the present invention, and FIGURE 5 is an end elevation illustrating the trap of present invention in the closed position.

An animal trap constructed according to the present invention is illustrated in FIGURE 1 in the open or set position. This trap consists of two jaws 10 and 11, a trigger means 12 and a spring 13. The jaw 11 consists of two side members 14 and 15 which are connected at one end by an end member which consists of two non-collinear sections 16 and 17 connected by a third section 18, and which are connected at their other end by an end member which consists of two non-collinear sections 19 and 20 which are connected by a third section 21. The third section 18 forms an obtuse angle with the end sections 16 and 17, and the third section 21 forms an obtuse angle with the end sections 19 and 20. Similarly, the jaw 10 consists of two side members 22 and 23 which are connected at one end by two non-collinear end sections 24 and 25 and a third section 26, and which are connected at the other end by two non-collinear sections 27 and 28 connected by a third section 29.

The two jaws 10 and 11 are pivotally attached to one another by means of a pivot 30 at one end of the trap and may be pivotally attached by a pivot 31 at the other end. In some embodiments the jaws 10 and 11 are pivotally attached at the pivot 30 only with no connection being made at the other end. In either case the two jaws can rotate about a common axis that passes through the pivot point or points. When the trap is open the two jaws 10 and 11 cross one another only at the axis (see FIGURES 1 and 4), and when the trap is closed the jaws 10 and 11 cross one another at three points (see FIGURE 5).

The spring 13 is an expanding pressure coil spring that is adapted to force its two ends 32 and 33 away from one another. The use of a spring of this nature is made possible by the offset nature of the jaws, that is having members such as end sections 16 and 17 in non-collinear relationship attached to diammetrically opposed points of the pivot 30 by the third section 18. When the trap is released, and the jaws 10 and 11 rotate under the influence of the spring 13, the ends 32 and 33 of the spring 13 slide outwardly along the end members of the trap. When the two ends 32 and 33 of the spring 13 pass over the third sections 18 and 26 to the non-collinear sections 19, 28 and 20, 27, the wedge along which the openings in the ends 32 and 33 are sliding rapidly becomes slimmer and consequently the spring exerts a rapidly increasing pressure on the jaws. This wedge becomes so slim after this point that it is virtually impossible to displace the spring by prying the jaws 10 and 11 apart. When an animal, which is larger than the trap was designed for, is caught it will be able to struggle free unharmed because the jaws will not rotate beyond this critical point. However, a smaller animal cannot struggle free because the jaw will rotate beyond this critical point. In this manner, the trap avoids catching animals larger than those intended to be caught. In addition, when the trigger means is being set the jaws do not experience a great deal of pressure, because the spring ends 32, 33 will be in contact with the third sections 18, 26. This simplifies the task of setting the trap.

The trigger means of the present invention is illustrated in FIGURE 2, and consists of a first trigger member 34 and a second trigger member 35. The second trigger member 35 consists of a trigger bar 41 terminating in a diamond shaped base 36 which is pivotally attached to a closed hook 37 formed in one end of the first trigger member 34. The trigger means is slidable and pivotally attached to the jaw 11 by the closed loop 40, as illustrated in FIGURE 3. The second trigger member 35 may be held roughly in position by means of a small ring 38 (see FIGURE 2).

When the trap is set, the spring is compressed and the jaws forced open to roughly the position shown in FIGURE 1 and the closed hook 37 of the first trigger member 34 is hooked over the jaw 10. The base 36 of the trigger member 35 is positioned between the trigger member 34 and the jaw 10. In the setting shown in FIGURE 1, the end member 28 is positioned over the base 36 of the trigger means. The base 36 of the trigger member 35 is diamond shaped so that if the trigger is moved in any direction it will pry the closed hook 37 off of the end member 25 and the jaws will then be free to rotate under the influence of the spring 13.

A safety bar 39 may be pivotally attached to the closed hook 37 as shown in FIGURES 2 and 3. When the trap is set and the safety bar 39 is not being used this bar may lie off to the side where it will not interfere with the operation of the trap, as is illustrated in FIGURE 1. When the safety bar 39 is being used it is positioned as shown in FIGURE 4, to pass under the jaw 10 on the opposite side as the trigger member 34 and over the jaw 11 on the same side as the trigger 34. If the trigger 35 is now disturbed, so that its base 36 tends to pry the closed loop 37 free from the jaw 10, the safety bar 35 will bind between the two jaws 10 and 11 and prevent this movement. In this way the trap is rendered safe for handling for the purpose of attaching bait or positioning the trap in a desired location. The safety bar can be readily disengaged after the trap has been located by sliding it out of contact with the jaws 10 and 11. As an alternative arrangement the safety catch 42, having a notch 43 provided therein, may be slidably fixed to one of the side members of the jaw and the end member of the other jaw hooked in the notch 43 to secure the trap in the open position so that it may be handled in complete safety.

The trigger means can be set at the bottom of the trap, as illustrated in FIGURE 1, or along the side members of the trap, as indicated in FIGURE 4, or it could be positioned between the end members 17 and 25 in a similar way, as illustrated between the end members 20 and 28 in FIGURE 1. When the trigger means is attached to the side members 14 and 22, its distance from either end can be adjusted by sliding it along these side members to the desired position. The trigger means could be set midway between the two ends to allow small animals to pass through unharmed, or it could be set near or on the top end to insure that the trap would only be tripped by comparatively larger animals. When it is set at the bottom, as illustrated in FIGURE 1, animals of any size may be able to trip the trigger means.

The tension required to release the trigger means can be varied when the trigger is set at one end of the trap, as is illustrated in FIGURE 1, by adjusting the distance between the trigger means and the pivot point. When the trigger means is placed close to the pivot point, and consequently close to the centre of the trap, more force is exerted on the retaining hook 37 than when the trigger means is set adjacent to one of the side members and consequently more force would be required to release the trigger means. In this way a simple and convenient adjustment can be made of the tension of the trigger means.

The trap can be set, as described above, to avoid catching animals under a predetermined size, and animals over a certain size, which is determined by the dimensions of the trap, can escape unharmed if they do actuate the trigger means. Thus the trap can be quite selective as to the size of animal caught.

The trap constructed in accordance with the present invention can be positioned in a variety of ways. The large diameter of the spring 13 makes it possible to position the spring so that it can be used as a base to set the trap on, as illustrated in FIGURE 1. If it is desired to attach the trap to a post, this can be done as is illustrated in FIGURE 4. The spring can be slipped over the post 42 and can be wedged in position at a desired height by means of the wedge 43. When the trap is set in this maner, it will not be necessary to attach a retaining chain or rope to the trap. In addition, the spring 13 could be nailed to the side of a wall or other mouting structure and the jaws 10 and 11 of the trap could be rotated within the large openings in the ends 32 and 33 of the spring 13 to any desired angle.

The design of a trap according to the invention may be varied to adapt the trap to particular trapping conditions or for particular species of animals. The opening in the coil of the spring 13 (see FIGURE 1) may be closely adjacent the line of the jaws when the trap is set so that the trap may be supported from the spring by a stake with the jaws extending downward from the spring and one set of jaws resting against the stake. The final squeezing power of the jaws of the trap can be increased considerably by making the sections of the end members (for example, the end sections 17 and 25 of FIGURE 5) more nearly parallel in the closed position thereby making a slimmer wedge for the openings in the ends 32 and 33 of the spring to slide along. This design permits use of a weaker spring making the trap easier to set.

The size and shape of the openings in the ends 32 and 33 of the spring can be selected according to the size of animal to be caught. For trapping mink, the jaws need not come closer than three-fourths of an inch to each other. In this case, as the jaws close the wedge along which the spring is acting becomes slimmer and the efficiency of the spring action increases so that when the jaws are still about five-eighths of an inch apart the spring will have expanded to exert maximum pressure to close the jaws. However, if for example a weasel, for which the jaws must close to three-eighths of an inch to kill, should get in the trap, the curves of the spring openings (which may be made egg shaped for this purpose) act to close the jaws tight. In the case of traps for larger animals, for example beaver, the jaws may close to only about three inches. An important advantage of this feature of the trap whereby the jaws need not be under full spring pressure when together in closed position is that it permits removal of one's fingers, or even a hand or arm in the case of large traps, in case of an accident when setting the trap.

What I claim as my invention is:

1. A trap for animals comprising two frames, each frame having side members forming the jaws of the trap and having end members joining together the side members, pivot means connecting together the end members of the two frames on a common axis so that the frames can rotate about said axis from an open position of the trap in which one side member of one frame is closely adjacent and parallel to one side member of the other frame to a closed position in which each said one side member of one frame is closely adjacent and parallel to the other side member of the other frame, each of the end members consisting of two non-collinear sections connected by a third section forming an obtuse angle with each of said two non-collinear sections, said end members being positioned to cross one another only at the common axis when the trap is open and to cross one another at three points when the trap is closed, two ring members encircling the adjacent end members one on either side of their pivot means, each ring member being adapted to slide freely along said end members to bring together said end members in the closed position of the trap, spring means adapted to urge apart the ring members toward the side members when the trap is being closed, said end members lying substantially parallel to each other in the open position of the trap and having portions at said common axis forming a cross with each other between said ring members thereby decreasing the effect of the force urging said side members apart until the trap is triggered and said side members move toward the closed position, and trigger means adapted to maintain the trap in open position against the action of the spring means and to be triggered to release the trap to its closed position, said trigger means comprising a first and a second trigger member, the first trigger member being slidably and pivotally attached at one end to one of the frames and having a hook at the other end adapted to engage the other frame when the trap is open, the second trigger member consisting of a trigger bar terminating in a base positioned at an angle to the trigger bar and adapted to be positioned between the first trigger member and said other frame when the trap is in the open position, whereby movement of said bar in any direction releases the trigger means.

2. A trap as claimed in claim 1, wherein said spring means comprises a coil spring the ends of which terminate in the ring members and the diameter of which is of the same order as the length of the end members.

3. A trap as claimed in claim 1, and further comprising a safety bar pivotally attached to said other end of the first trigger member and adapted to be positioned when the trap is opened to lie without said one of the frames and within said other frame.

4. A trap for animals comprising two frames, each frame having side members forming the jaws of the trap and having end members joining together the side members, pivot means connecting together the end members of the two frames on a common axis so that the frames can rotate about said axis from an open position of the trap in which one side member of one frame is closely adjacent and parallel to one side member of the other frame to a closed position in which each said one side member of one frame is closely adjacent and parallel to the other side member of the other frame, two ring members encircling two adjacent end members one on either side of their pivot means, each ring member being adapted to slide freely along said end members to bring together said end members in the closed position of the trap, spring means adapted to urge apart the ring members toward the side members when the trap is being closed, said end members lying substantially parallel to each other in the open position of the trap and having portions at said common axis forming a cross with each other between said ring members thereby decreasing the effect of the force urging said side members apart until the trap is triggered and said side members move toward the closed position, and trigger means adapted to maintain the trap in open position against the action of the spring means and to be triggered to release the trap to its closed position, said trigger means comprising a first and a second trigger member, the first trigger member being slidably and pivotally attached at one end to one of the frames and having a hook at the other end adapted to engage the other frame when the trap is open, the second trigger member consisting of a trigger bar terminating in a base positioned at an angle to the trigger bar and adapted to be positioned between the first trigger member and said other frame when the trap is in the open position, whereby movement of said bar in any direction releases the trigger means.

5. A trap as claimed in claim 4 wherein said spring means comprises a coil spring the ends of which terminate in the ring members and the diameter of which is of the same order as the length of the end members.

6. A trap as claimed in claim 4, wherein said trigger means further comprises a safety bar pivotally attached to said other end of the first trigger member and adapted to be positioned when the trap is opened to lie without said one of the frames and within said other frame.

7. A trap for animals comprising two frames, each frame having side members forming the jaws of the trap and having end members joining together the side members, pivot means connecting together the end members of the two frames on a common axis so that the frames can rotate about said axis from an open position of the trap in which one side member of one frame is closely adjacent and parallel to one side member of the other frame to a closed position in which each said one side member of one frame is closely adjacent and parallel to the other side member of the other frame, each of the end members consisting of two non-collinear sections connected by a third section forming an obtuse angle with each of said two non-collinear sections, said end members being positioned to cross one another only at the common axis when the trap is open and to cross one another at three points when the trap is closed, two ring members encircling adjacent end members on opposite sides of their pivot means, said ring members being adapted to slide freely along said end members, and spring means adapted to urge apart the ring members to bias the jaws from the open to the closed position, and trigger means adapted releasably to maintain the trap in open position against the action of the spring means and to be triggered to release the trap to its closed position, said trigger means comprising a first and a second trigger member, the first trigger member being slidably and pivotally attached at one end to one of the frames and having a hook at the other end adapted to engage the other frame when the trap is open, the second trigger member consisting of a pivoted trigger bar having a portion positioned to be engaged by an animal entering the trap and a portion engaging said first trigger member adjacent said hook when the trap is in open position to disengage said hook from said other frame upon pivotal movement of said second trigger member and thereby release the trap.

8. An animal trap comprising two frames, each frame formed of wire bent to provide opposite side portions constituting the jaws of the trap and opposite end portions joining together the side portions, said two frames being of substantially the same width but one of said frames being slightly shorter and fitting inside the other frame, pivot means joining together the end members of the two frames at their midpoints so that the frames can rotate about a common axis from an open position of the trap in which a first side portion of one frame is closely adjacent and parallel to a first side portion of the other frame to a closed position in which said first side portion of one frame is closely adjacent and parallel to the second side portion of the other frame, two ring members encircling the adjacent end portions of said frames, one on either side of said pivot means, each ring member being adapted to slide freely along said end portions to move said frames from open to closed position, spring means adapted to urge apart the ring members toward said side portions when the trap is being closed, said end portions lying substantially parallel to each other in the open position of the trap and having portions of one frame forming a cross with portions of the other frame at said common axis thereby decreasing the force exerted by said spring on said frames when the trap is in fully open position and trigger means for releasably maintaining the trap in open position against the action of the spring means, said trigger means comprising a first pivoted trigger member freely rotatable around and slidable along said wire forming a side portion of one of said frames and having a hook adapted to engage the other frame when the trap is in open position and a second pivoted trigger member having a portion positioned to be engaged by an animal entering the trap and a portion engaging said first trigger member adjacent said hook when the trap is in open position to disengage said hook from said other frame upon pivotal movement of said second trigger member and thereby release the trap.

9. A trap for animals comprising a pair of rectangular frames and a pair of actuating rings, both fabricated from substantially round wire stock, the rings being yieldably urged apart by a spring, and a trigger mechanism, one pair of opposite sides of each of said pair of frames forming jaw members and the other pair of opposite sides forming end members, said end members each having a short central portion disposed between two non-collinear but substantially parallel arm portions joining the central portion to the ends of the jaw members, means at both ends of each frame providing engagement between the two frames such that each end member of one frame is immediately adjacent an end member of the other frame and the central portions of each of said end members intersect, said means comprising pivot means joining the adjacent end members at the point of intersection whereby one frame may rotate about the other from a set position in which the adjacent end members cross at only the pivot point, to a closed position in which they cross at two additoinal points, said loops encircling one pair of adjacent end members and adapted to be yieldably urged together towards the pivot point by the arms as the trap is moved to set position, said trigger mechanism comprising a retaining arm pivotally connected at one end to one of the frames and adapted to be slidable along a jaw member thereof and having a hook at the other end adapted releasably to grip the other frame, and a pivoted release member associated with said other end of the retaining arm and adapted, when moved, to dislodge said hook so as to cause disengagement thereof from the jaw of the other frame, said release member including a portion positioned to be engaged by an animal entering the trap.

10. An animal trap comprising an inner frame and an outer frame, each frame comprising heavy wire bent in one direction to form opposite side portions and opposite jaw end portions connecting said side portions and bent in a second direction substantially perpendicular to said first direction to provide in each end portion two offset sections connected by a central section disposed at an obtuse angle to said offset sections the opposite end portions of each frame being bent in the same direction and the end portions of one frame being bent oppositely from the adjacent end portions of the other frame, both of said frames being of the same width so that the side portions are spaced an equal distance apart but said inner frame being slightly shorter than said outer frame so that the end portions of the inner frame fit inside both end portions of the outer frame, pivot means connecting together the central sections of the end portions of the frames so that the frames can rotate about a common axis from an open position of the trap in which one side portion of one frame is closely adjacent and parallel to one side portion of the other frame to a closed position in which said one side portion of one frame is closely adjacent and parallel to the other side portion of said other frame, a coil spring comprising a spring coil having end portions forming two arms which are biased by the spring coil to move away from one another and ring portions on the ends of said arms, said ring portions encircling two adjacent end portions of said frames one on either side of said pivot means, each ring portion being freely slidable along said end portions to swing said frames to closed position of the trap under bias of said spring and being pivoted around said end portions to swing from an operative position in which said spring projects out from said frames to a compact position in which said spring lies inside said frames, and trigger means for releasably holding said trap in open position, said trigger means comprising a first pivoted trigger member freely rotatable around and slidable along said wire forming a side portion of one of said frames and having a hook adapted to engage the other frame when the trap is in open position and a second pivoted trigger member having a portion positioned to be engaged by an animal entering the trap and a portion engaging said first trigger member adjacent said hook when the trap is in open position to disengage said hook from said other frame upon pivotal movement of said second trigger member and thereby release the trap.

References Cited in the file of this patent
UNITED STATES PATENTS

| | | |
|---|---|---|
| 2,459,580 | Oleen | Jan. 18, 1949 |
| 2,564,811 | Mau | Aug. 21, 1951 |
| 2,701,428 | Mau | Feb. 8, 1955 |